No. 735,315. PATENTED AUG. 4, 1903.
T. TERZANO.
CAR FENDER.
APPLICATION FILED JUNE 8, 1903.
NO MODEL.
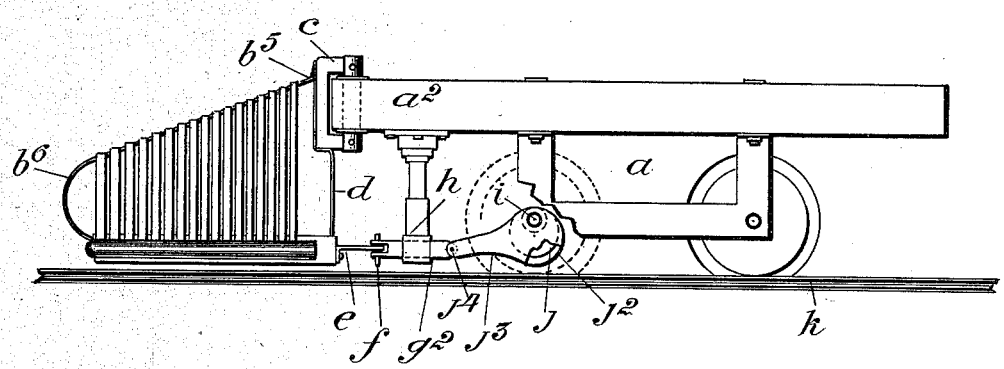
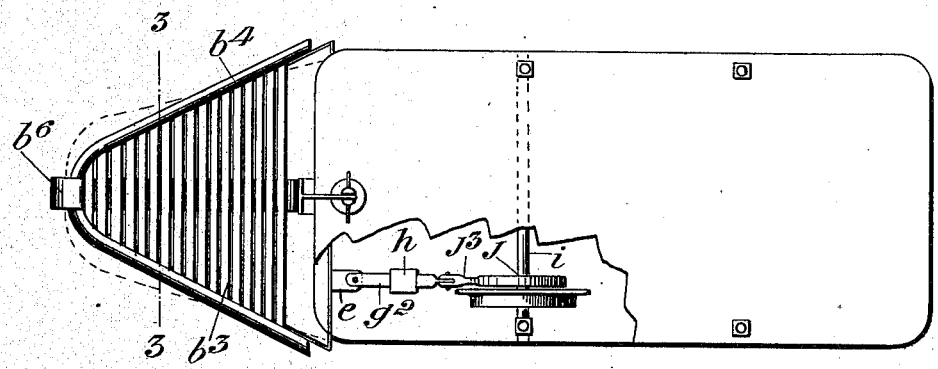
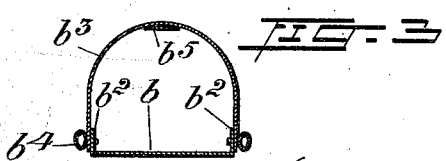
WITNESSES
INVENTOR
BY Teodosio Terzano
Edgar Tate & Co
ATTORNEYS No. 735,315.

Patented August 4, 1903.

UNITED STATES PATENT OFFICE.

TEODOSIO TERZANO, OF HOOSICK FALLS, NEW YORK.

CAR-FENDER.

SPECIFICATION forming part of Letters Patent No. 735,315, dated August 4, 1903.

Application filed June 8, 1903. Serial No. 160,473. (No model.)

*To all whom it may concern:*

Be it known that I, TEODOSIO TERZANO, a citizen of the United States, residing at Hoosick Falls, in the county of Rensselaer and State of New York, have invented certain new and useful Improvements in Car-Fenders, of which the following is a specification, such as will enable those skilled in the art to which it appertains to make and use the same.

The object of this invention is to provide an improved fender for tramway-cars whereby the serious and sometimes fatal accidents occasioned by a person being struck by a car while in motion will be avoided, a further object being to provide a fender for tramway-cars which will prevent a person or party struck thereby from passing beneath the car; and with these and other objects in view the invention consists in a device of the class specified constructed as hereinafter described and claimed.

The invention is fully disclosed in the following specification, of which the accompanying drawings form a part, in which the separate parts of my improvement are designated by suitable reference characters in each of the views, and in which—

Figure 1 is a side view of one truck of a car provided with my improvement; Fig. 2, a plan view thereof, and Fig. 3 a section on the line 3 3 of Fig. 2.

In the drawings forming part of this specification I have shown at $a$ one of the trucks of a car and at $a^2$ the front platform of a car, and in the practice of my invention I provide a fender or guard of the following construction.

My improved fender or guard consists of a bottom member $b$, preferably triangular in general form and the base of which is directed backwardly and the apex forwardly, and this bottom $b$ may consist of a frame of similar form, if desired, and, as shown in the drawings, the bottom $b$ is provided with upwardly-directed side members $b^2$, to which are secured spring bow-pieces $b^3$, and around the bottom portion of the fender or guard and secured thereto in any desired manner is an elastic tubular member $b^4$. The spring bow-pieces $b^3$ decrease in dimensions from the rear portion of the fender or guard forwardly, and the form of said fender or guard is thus made practically similar to one-half of a cone. Connected with the front of the platform $a^2$ is a yoke-shaped member $c$, similar in form to a clevis, and secured thereto is a spring-metal strip $b^5$, which forms a part of the fender proper and which extends downwardly and forwardly beneath the spring bow-pieces $b^3$ and the front end of which is formed into a loop $b^6$ and secured to the bottom $b$ of the fender or guard proper.

An upright member $d$ is secured to the central rear portion of the bottom of the fender or guard, and to the member $c$ and at one side thereof is a backwardly-directed arm $e$, with which is loosely connected at $f$ a link member $g^2$, which passes loosely through the bottom portion of a hanger $h$, secured to the bottom of the platform $a^2$. The front axle $i$ of the truck $a$ is provided with an eccentric $j$, on which is mounted an eccentric-band $j^2$, and the eccentric-band $j^2$ is provided with an arm $j^3$, which is pivotally connected with the link member $g^2$ at $j^4$; and by means of this construction the movement of the car will give the fender or guard a lateral swinging motion, (indicated by the dotted lines $x$ in Fig. 2.)

The fender or guard may be supported at any desired distance above the track $k$, and my invention is not limited to the exact details of the form of the fender or guard and the construction thereof as herein shown and described nor to the particular means herein shown and described for connecting the fender or guard with the platform of the car, as it will be apparent that various changes in and modifications of the details of this arrangement may be made without departing from the spirit of my invention or sacrificing its advantages.

The shape of the fender or guard and the constant movement thereof when the car is in motion is such that a person or object struck thereby will be thrown or moved to one side and the danger of such person or object being run over by the car is almost absolutely avoided.

Having fully described my invention, what I claim as new, and desire to secure by Letters Patent, is—

1. A fender or guard for tramway-cars suspended from and in front of the platform of the car and in operative connection with an eccentric mounted on one of the axles of the car whereby the fender or guard is given a lateral swinging motion, substantially as shown and described.

2. A fender or guard for a tramway-car supported in front of the car and adapted to be swung in a horizontal plane, an eccentric connected with an axle of the car and devices connected with said eccentric and with the fender or guard and adapted to give the latter a swinging sidewise movement, substantially as shown and described.

3. A fender or guard for a tramway-car consisting of a bottom portion triangular in form, transversely-arranged spring bow members secured thereto, a central top member to which the spring bow members are secured and an elastic member passing around the bottom portion of the fender or guard, substantially as shown and described.

4. A fender or guard for a tramway-car consisting of a bottom portion triangular in form, transversely-arranged spring bow members secured thereto, a central top member to which the spring bow members are secured and an elastic member passing around the bottom portion of the fender or guard, and means whereby the fender or guard is given a lateral swinging motion by the movement of the car, substantially as shown and described.

In testimony that I claim the foregoing as my invention I have signed my name, in presence of the subscribing witnesses, this 29th day of May, 1903.

TEODOSIO TERZANO.

Witnesses:
HARRY DORR,
EURY COZEINOLA.